UNITED STATES PATENT OFFICE.

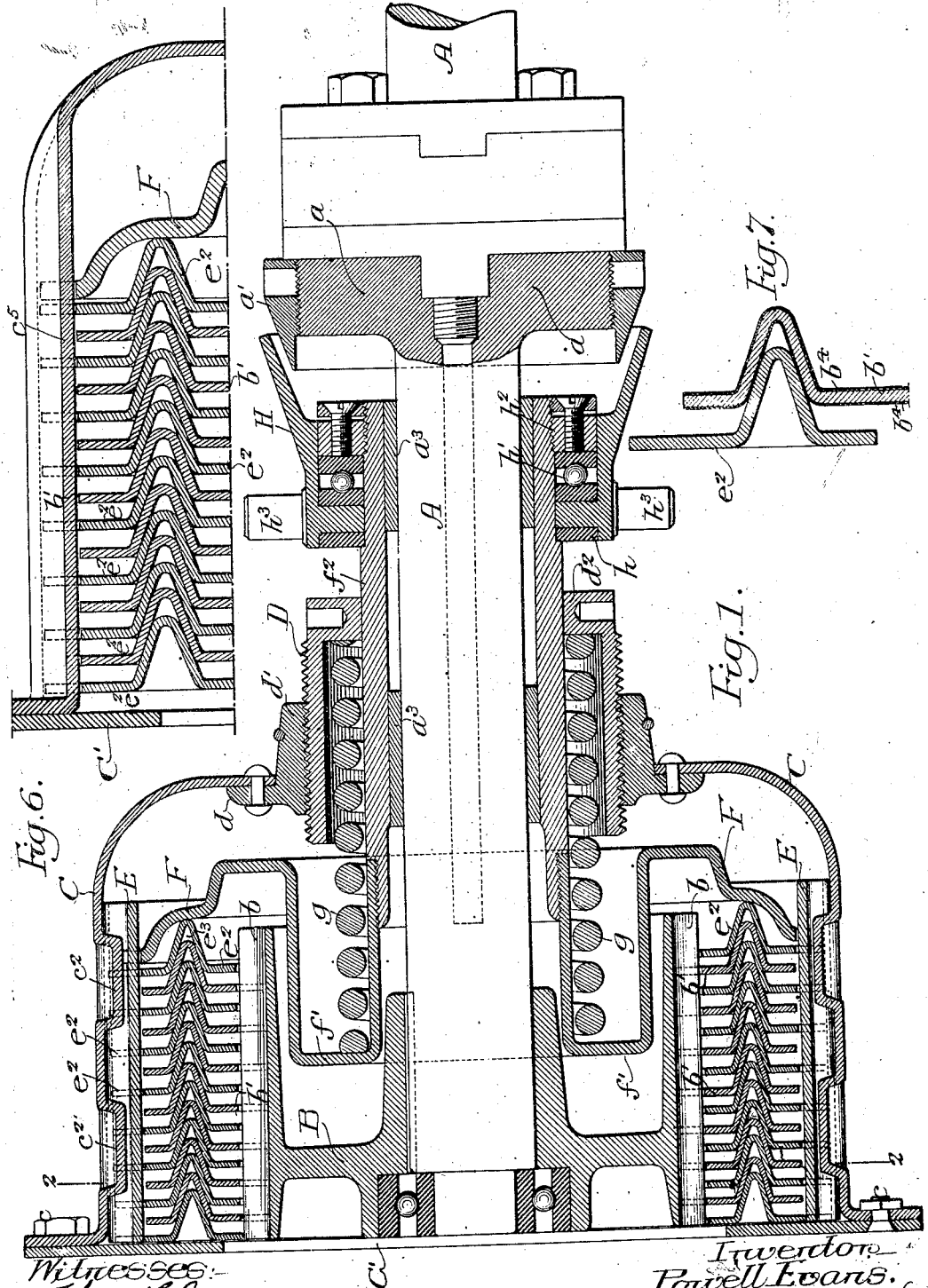

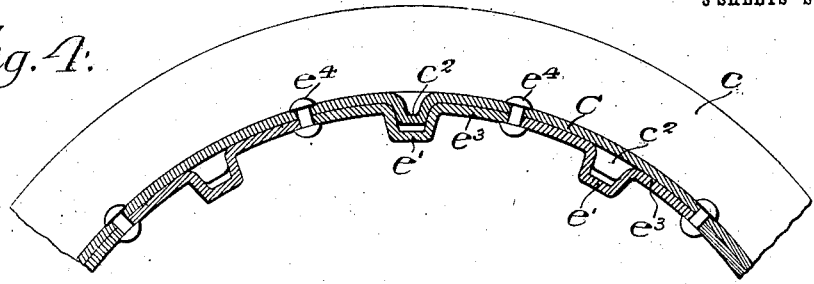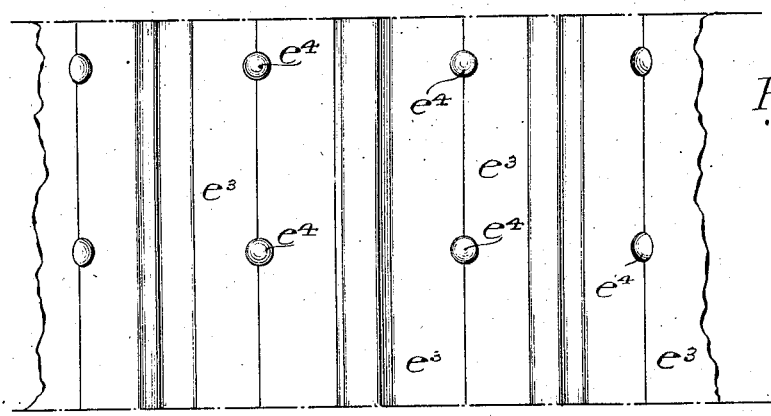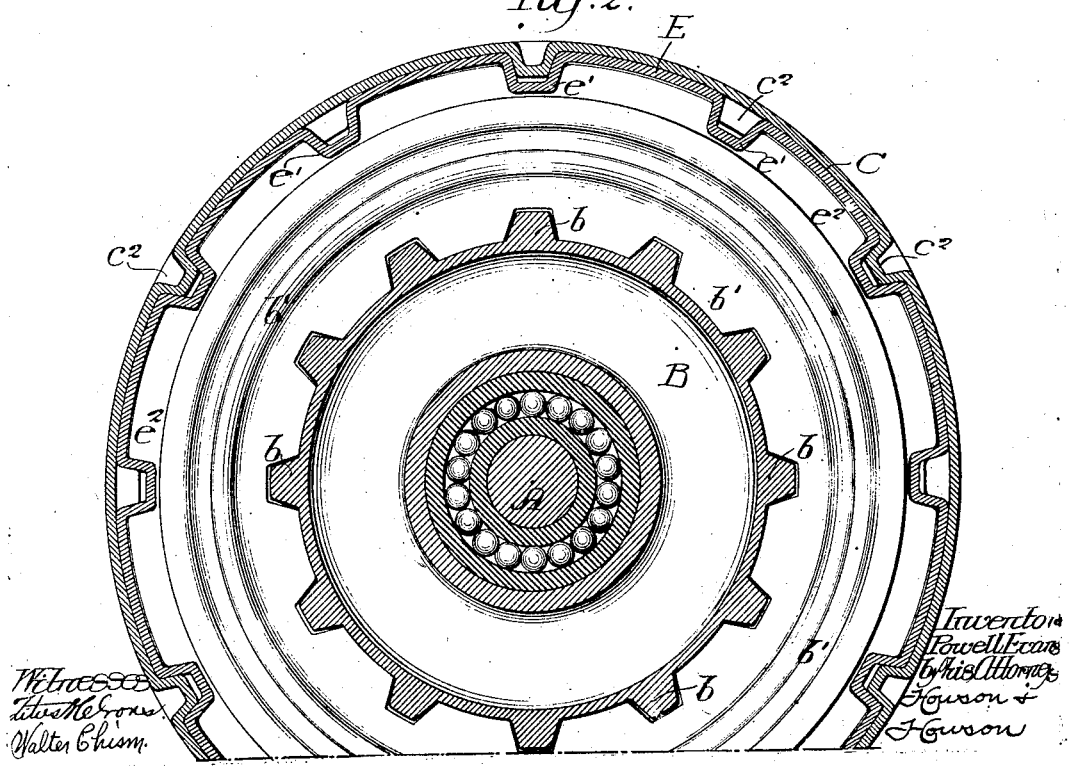

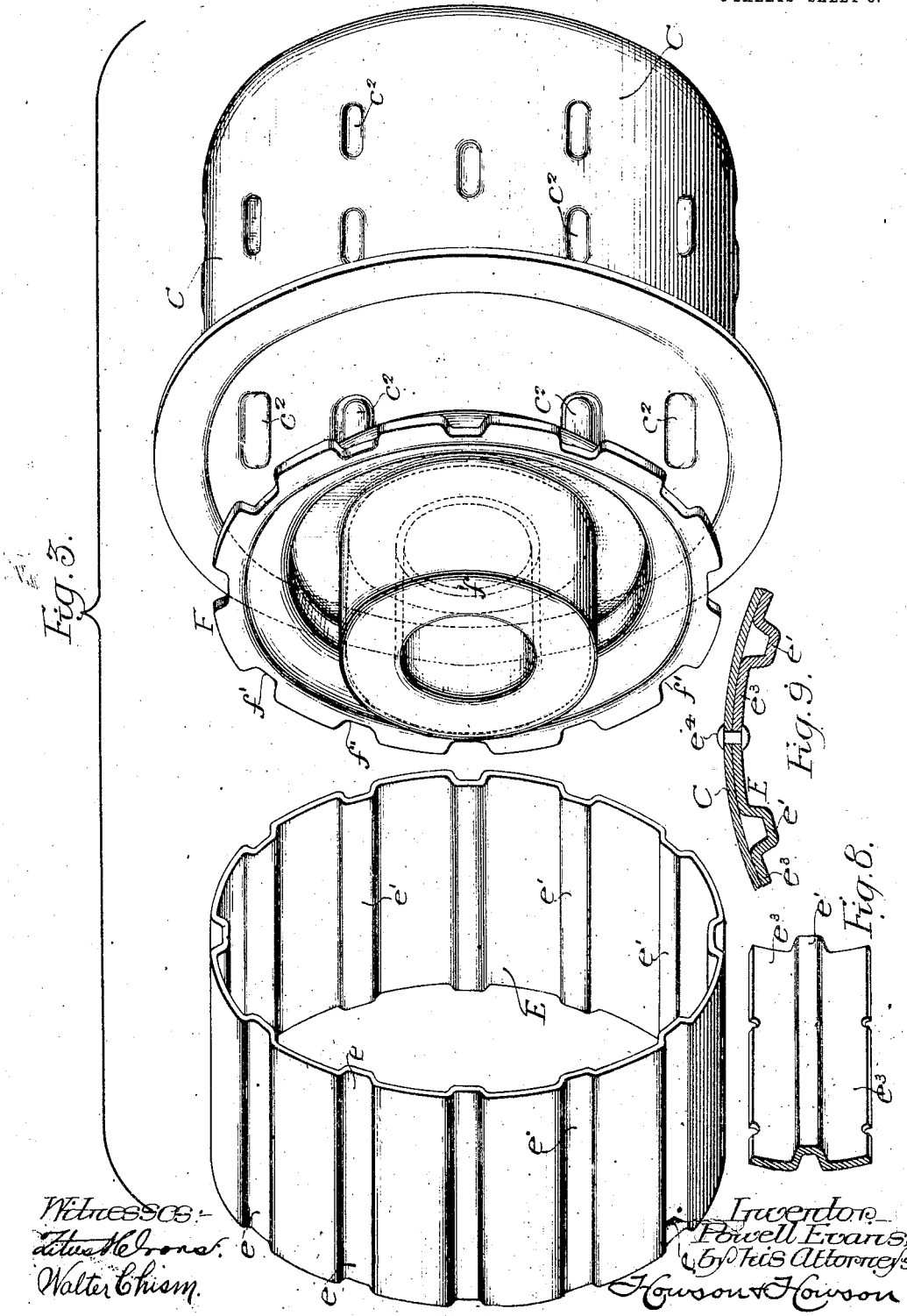

POWELL EVANS, OF PHILADELPHIA, PENNSYLVANIA.

FRICTION-CLUTCH.

940,679.   Specification of Letters Patent.   Patented Nov. 23, 1909.

Application filed November 1, 1907. Serial No. 400,253.

*To all whom it may concern:*

Be it known that I, POWELL EVANS, a citizen of the United States, residing in Philadelphia, Pennsylvania, have invented certain Improvements in Friction-Clutches, of which the following is a specification.

One object of my invention is to provide a friction clutch of the plate type, which shall be relatively inexpensive to construct though none the less efficient and reliable in operation.

Another object of the invention is to provide a friction clutch in which certain of the operating parts hitherto made of cast or wrought metal shall be so constructed as to permit of their being formed of pressed metal with the idea of lightening and cheapening the construction.

It is further desired to provide a friction clutch having the above noted characteristics and employing a plurality of frictionally engaging plates, in which said plates while possessing the qualities requisite for permitting the proper slipping and engagement of their surfaces shall be less costly than has heretofore been considered possible.

These objects and other advantageous ends I secure as hereinafter set forth, reference being had to the accompanying drawings, in which:—

Figure 1, is a vertical section of my improved clutch, illustrating the detail arrangement of its parts; Fig. 2, is a vertical section of the clutch in Fig. 1, taken on the line 2—2 of said figure; Fig. 3, is a detached perspective view of certain parts of the clutch; Figs. 4 and 5, are respectively a fragmentary vertical section and a plan of one modification of my invention; Fig. 6, is a fragmentary vertical section of a second modification of my invention; Fig. 7, is an enlarged vertical section illustrating the preferred construction of the friction plates used in my clutch; Fig. 8, is a perspective view of one of the sections which are employed in the construction illustrated in Figs. 4 and 5, and Fig. 9, is a fragmentary vertical section of a slightly modified form of the construction shown in Fig. 4.

In the above drawings, A represents a shaft driven from any suitable source of power and having a flange $a$ provided with an adjustable nut $a'$ whose outer surface is beveled or inclined. To the end of this shaft is keyed or otherwise fixed a substantially cylindrical structure B on whose outer surface is formed a series of ribs $b$ extending in lines substantially parallel to the shaft A.

The case for the clutch is illustrated at C and as shown is provided with a flange $c$ riveted or bolted to a member $C'$ to be driven, which in the present instance consists of a ring forming part of or attached to the web of a pulley, fly wheel or similar structure. Said case C is of a generally cylindrical form and is preferably made of a single sheet of pressed steel. Its end opposite that having the flange $c$ is extended or flanged inwardly and has riveted to it a flange $d$ of a nut $d'$ adjustably threaded upon an inwardly flanged collar D.

In the cylindrical surface of the case C are pressed or otherwise formed a number of elongated depressions and the inwardly extending portions or ribs $c^2$ resulting from these fit into transversely extending recesses $e$ of a drum-like structure E so as to prevent the same from rotating independently of the case. These recesses form inside the drum a series of internally projecting ribs $e'$, which, as shown in the figures, enter suitable notches in the peripheries of a series of annular plates $e^2$ within said drum. As shown in Fig. 1, these plates extend inwardly toward the ribs $b$ of the structure B and there are mounted upon this latter a second series of plates $b'$ so formed that their outer edges clear the ribs $e'$ of the drum structure E, while their inner edges are notched so as to receive the ribs $b$ whereby they are connected to the structure B and the shaft A so as to be compelled to turn therewith. The plates of these two sets alternate with one another and each plate has a circular, pressed out rib of angular section so that the plates engage each other only upon the inner and outer surfaces of these ribs.

For pressing the two sets of plates together in order to couple the members of the clutch, I provide a plate F of pressed steel, having a series of notches $f$ formed in its outer edge for non-rotatably holding it in the drum E. This plate is so shaped as to engage the apex of the circular rib $e^3$ of the endmost of the plates $e^2$ and has its portion $f'$ adjacent to the shaft A with which it is concentric so formed as to provide a relatively deep annular cup which projects under a part of the cylindrical structure B.

A sleeve $f^2$ is adjustably screwed into this inner portion of the plate F and has interposed between it and the shaft a plurality of bronze or other suitable rings or sleeves $a^3$. A spring $g$ is confined between the bottom of the cup shaped portion of the plate F and the inwardly extending flange $d^2$ of the threaded sleeve D so as to continually tend to press said plate into engagement with the endmost of the disks $e^2$ and consequently to press all of the disks together to frictionally couple the members of the clutch.

An internally beveled collar or sleeve H is mounted on the sleeve $f^2$ to receive and engage the beveled portion of the nut $a'$ on the flange $a$ belonging to the shaft A. This sleeve is free to rotate relatively to the sleeve $f^2$, inasmuch as it is confined between a ring $h$ which engages a shoulder on said sleeve, and ball bearings $h'$ which act against a nut $h^2$ screwed upon the end of said sleeve and retained in position in any desired manner. Upon the sleeve H are projecting lugs $h^3$ placed to be engaged by a clutch-operating lever of the well known form.

With the various parts shown in Fig. 1, it will be seen that the spring $g$ so acts upon the plate F as to force the plates $b'$ and $e^2$ into frictional engagement with each other and so couple the members of the clutch. If, however, by means of a suitable operating lever in engagement with the lugs $h^3$, the beveled sleeve H is so shifted that the nut $a'$ is caused to engage its inner beveled surface, the spring $g$ is compressed by the plate F, which is drawn away from the friction plates $b'$ and $e^2$ and these latter are hence permitted to move out of frictional engagement with each other to uncouple the members of the clutch.

It will be understood that the drum E, while preferably constructed by pressing the ribs $e'$ in a cylindrical section of steel tubing or in a flat strip which is afterward curved into shape, may, if desired, be constructed as shown in Figs. 4 and 5. In such case such drum would be divided up into a number of segmental sections $e^5$ joining each other along lines parallel to the shaft A and held to the case C by rivets $e^4$ which preferably pass through holes formed half in one section and half in the adjacent section. In the case shown in Figs. 4 and 5 the rib $e'$ of each section of the drum is engaged by an interior rib $c^2$ of the case C, while in the construction shown in Fig. 9 I depend entirely upon the rivets $e^4$ to hold the sections to the said case.

In some cases it may be advisable to altogether omit the drum E, in which event I form a number of parallel ribs $c^5$ in the case C by pressing inwardly portions of its cylindrical surface and mount the plates $e^2$ directly on these ribs. In such case the spring pressed plate F, while engaging one of the ribs $e^2$ as above noted, will have its periphery so notched as to permit it to fit over the ribs $c^5$ and turn with the case.

Under ordinary conditions, clutches of the type to which my invention belongs are preferably made with their plates $e^2$ of steel and their plates $b'$ of bronze or other material which will permit the proper slipping and engaging actions between the various sets of plates, as is required in the coupling and uncoupling of the clutch. Such construction is, however, prohibitory under many conditions on account of the cost of the bronze plates. In order therefore to reduce the expense of this construction while obtaining the desired results, I form both sets of plates $b'$ and $e^2$ of steel but provide the plates $b'$, which are coupled to the structure B, with coatings $b^4$ and $b^5$ on their engaging faces, which coatings are formed of bronze or other suitable material as found best under practical conditions. These coatings may be electrolytically deposited or otherwise applied as desired, but inasmuch as they are so attached to the faces of the plates $b'$ as to be practically integral therewith, it will be seen that I attain by them all of the advantages resulting from solid bronze plates.

I claim:

1. The combination of a substantially cylindrical casing of pressed metal having a series of inwardly pressed portions forming interior ribs, a shaft substantially axially central of said cylindrical casing, a ribbed structure within the casing on said shaft, a series of plates notched to receive the ribs of said structure and mounted thereon, a second series of plates alternating with those of the first series and operatively connected to the interior of the ribs of the casing, a spring plate constructed to be held from rotating by said interior ribs of the casing, a spring adjustable between said casing and said spring plate, with means for moving the spring plate to compress the spring and release the plates of the two series from frictional engagement with each other.

2. The combination in a clutch of a casing an internally ribbed drum mounted within and non-rotatably held to the casing, a series of annular plates notched to receive the ribs of the drum and mounted within the same, a substantially cylindrical structure also provided with ribs, a second series of plates alternating with those of the first series and notched to receive the ribs of said cylindrical structure, with means for pressing the plates together, and means for relieving said plates of pressure.

3. The combination in a clutch of a casing, a drum within the casing provided with longitudinally extending recesses forming interior ribs and rigidly held to the casing, a series of plates notched to receive the ribs of the drum, a second series of plates also notched and alternating with the plates of the first series, a ribbed supporting structure for said latter series of plates, a plate notched to engage the ribs of the drum and placed to engage the end plate of the series, a spring operative between the casing and said latter plate for causing the members of the clutch to be coupled, with means for compressing said spring and releasing the clutch members.

4. The combination in a clutch of a casing, a drum within the casing provided with longitudinally extending recesses forming interior ribs, there being pressed portions on the casing extending into said recesses, a series of plates notched to receive the ribs of the drum, a second series of plates also notched and alternating with the plates of the first series, a ribbed supporting structure for said latter series of plates, a plate notched to engage the ribs of the drum and placed to engage the end plate of the series, a spring operative between the casing and said latter plate for causing the members of the clutch to be coupled, with means for compressing said spring and releasing the clutch members.

5. The combination of a shaft having on it a ribbed supporting structure, a series of plates mounted thereon and notched to receive the ribs of said structure, an internally ribbed structure having notched plates fitting its ribs and alternating with the plates of said first series, a spring plate placed to engage the endmost plate, a nut extending around the shaft and adjustably threaded into the end of the structure having the inwardly extending ribs, a spring around the shaft placed between the nut and the spring plate, with means for moving the spring plate against the action of the spring to uncouple the clutch members.

6. The combination of a substantially cylindrical casing of pressed metal having at one end an inwardly extending flange and at the other end an outwardly extending flange, said casing having a series of inwardly pressed portions forming interior ribs, a ribbed supporting structure within the case, a series of plates notched to receive the ribs of such structure and mounted thereon, a second series of plates alternating with those of the first series and operatively connected to the interior ribs of the case, a spring plate constructed to be held from rotating by the interior ribs of the case, said spring plate being of pressed metal and formed with a portion extending under the plate supporting structure, a spring entering said portion of the spring plate, a structure attached to the inwardly projecting flange of the case and engaging the other end of the spring, with means for moving the spring plate to compress the spring, and release the plates of the two series from frictional engagement with each other.

In testimony whereof, I have signed my name to this specification, in the presence of two subscribing witnesses.

POWELL EVANS.

Witnesses:
CLEAYTON NEWBOLD,
JOHN J. JACKSON.